(12) United States Patent
Lazzarotto et al.

(10) Patent No.: US 7,532,872 B2
(45) Date of Patent: May 12, 2009

(54) WIRELESS PERIPHERAL INTERFACE WITH UNIVERSAL SERIAL BUS PORT

(75) Inventors: Sergio Lazzarotto, Marin (CH);
Jean-Daniel Zanone, Lausanne (CH);
Gerhard A. Schneider, Mex (CH)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 11/835,645

(22) Filed: Aug. 8, 2007

(65) Prior Publication Data

US 2008/0022031 A1    Jan. 24, 2008

Related U.S. Application Data

(63) Continuation of application No. 10/919,673, filed on Aug. 16, 2004, now Pat. No. 7,269,400, which is a continuation of application No. 09/654,194, filed on Sep. 1, 2000, now Pat. No. 6,782,245.

(60) Provisional application No. 60/153,286, filed on Sep. 10, 1999.

(51) Int. Cl.
*H04B 17/00*    (2006.01)
*H04M 1/00*    (2006.01)

(52) U.S. Cl. .............. 455/226.1; 455/414.1; 455/557; 370/315; 710/63; 710/69

(58) Field of Classification Search .............. 455/226.1, 455/557, 414.1, 500, 67.11, 550.1, 553.1, 455/556.1, 575.7, 101, 129; 370/315, 463
See application file for complete search history.

(56) References Cited

U.S. PATENT DOCUMENTS

| | | | | |
|---|---|---|---|---|
| 4,672,154 A | * | 6/1987 | Rodgers et al. | 178/19.07 |
| 5,721,783 A | * | 2/1998 | Anderson | 381/328 |
| 6,236,365 B1 | * | 5/2001 | LeBlanc et al. | 342/457 |
| 7,269,400 B2 | * | 9/2007 | Lazzarotto et al. | 455/226.1 |

* cited by examiner

*Primary Examiner*—Tony T Nguyen
(74) *Attorney, Agent, or Firm*—Fenwick & West LLP

(57) ABSTRACT

A wireless peripheral interface is used for coupling with a Universal Serial Bus (USB) port for connecting a wireless peripheral with a host computer or controller. Wireless peripheral devices (e.g., keyboard, mouse, trackball, touch pad, joysticks, and game controllers) transmit communication signals, e.g., radio frequency (RF) signals, to the peripheral interface, which are received and processed into formats suitable for transmission to the host computer or controller via USB, either alone or in combination with other standard external bus systems, such as serial and PS/2.

17 Claims, 14 Drawing Sheets

WIRELESS PERIPHERAL INTERFACE WITH UNIVERSAL SERIAL BUS PORT

CROSS-REFERENCE TO RELATED APPLICATION

This application is a continuation of U.S. application Ser. No. 10/919,673, filed on Aug. 16, 2004, entitled "Wireless Peripheral Interface with Universal Serial Bus Port," which is a continuation of U.S. application Ser. No. 09/654,194, filed on Sep. 1, 2000, entitled "Wireless Peripheral Interface with Universal Serial Bus Port," which claims the benefit of U.S. Provisional Application No. 60/153,286, filed on Sep. 10, 1999, the contents of each of which are incorporated by reference.

BACKGROUND OF THE INVENTION

1. Field of the Invention

The invention relates to systems for communicating with peripheral devices and controllers, and more particularly, to systems for wireless communications with such devices.

2. Description of Background Art

As the use of personal computers has been more ubiquitous in all phases of professional and personal life, and with the increasing popularity of graphical user interfaces for both personal computers and workstations, the need for sophisticated methods of communication between a peripheral and a host system has become fundamental to the successful operation of the overall system. The variety of available peripherals has expanded dramatically with the increasing power available from the microprocessors available for such systems, but peripherals such as keyboards, mice, trackballs, touch pads, game pads, joysticks, remote controllers, and so on are well-known for use with host systems of many types, including PC's, workstations and other types of microprocessor-controlled devices including video game systems, or other office or household devices. To operate in conventional environments, each of these peripherals is connected to its host system via a hardware port. Moreover, peripherals in conventional environments communicate with a host through a proprietary protocol.

While such communications protocols between conventional host systems and peripherals have been very successful at bringing substantial power and flexibility to the user, they do suffer from some limitations. Among others, most host systems have only a limited number of available ports, and cannot share such ports for simultaneous operation with a number of peripherals. This imposes significant limitations on the flexibility with which the system can be used. For example, if only two serial ports are available, only two serial peripherals can be simultaneously connected to the host system. Similarly, and particularly applicable to interactive devices such as modem video games or teaching environments, it has been difficult to permit multiples of players to communicate with a host system in a simultaneous manner without providing a separate communications channel for each such device.

Devices that communicate with their host systems without hard-wired connections are also well known in the art. Infrared remote control devices for use with modern home electronics such as television, VCR or stereo are readily available in the marketplace. However, such devices have little computational power, and basically use relatively simple protocols to communicate to a host which of several buttons have been depressed by the user of the remote device. In conventional computing environments, systems such as the IBM PC Jr. implemented a wireless keyboard using infrared techniques, but suffered because the infrared link needed to be pointed almost precisely at the associated receiver on the host to maintain communications. This proved to be difficult to achieve, leading to abandonment of the design and the system. In general, infrared devices can operate only if they are pointed in the direction of the receiver, which is usually at or near the host system.

More recently, other wireless devices have been introduced. For example, the Microsoft Cordless Mouse and the Genius NewScroll Wireless Mouse each use an RF communications link. In addition, various other infrared and RF devices by various other manufacturers are known in the art. However, while these devices have been very effective at providing communication between a single peripheral and an associated host, they have not provided the broader solution necessary to connect multiple types of devices to the host, nor have they permitted concurrent connection of multiple devices to the host.

A new type of external bus that is expected to replace parallel and serial ports is the universal serial bus (USB). Introduced in computers shipped in 1997, USB has a transfer speed of up to 12 megabits per second (Mbps). It is designated primarily for low-to-mid-speed peripheral devices, such as keyboards, mice, modems, printers, joysticks, and some scanners. A main advantage of USB over traditional ports is that it offers easy expandability (e.g., up to 127 devices can be daisy chained). All USB devices support plug and play and hot swapping as well. The computer automatically recognizes any USB device as soon as it's plugged in or added to the chain. Desktop computers that support USB typically have two four-pin USB ports—one for a keyboard and mouse daisy chain, the other to daisy chain all other USB devices.

The advantages of USB make it ideally suited for use in a wireless system, particularly for concurrent connection of multiple devices to the host computer. Thus, by integrating the USB into a wireless system, an increased number of configurations are possible.

Accordingly, there is a need for a system capable of permitting multiple peripheral devices to communicate with a host system in a simultaneous manner. Such a method and apparatus should include one or more USB ports to maximize expandability and simplify the connection of peripherals to the host computer.

SUMMARY OF THE INVENTION

The present invention includes a communication hub that couples a wireless peripheral with a universal serial bus (USB) configured device. The USB configured device may be, for example, a USB-enabled host computer system. The communication hub includes a wireless peripheral interface. In one embodiment, the wireless peripheral interface includes an antenna, a communication front-end, and a processor.

The antenna is wirelessly coupled to receive a communication signal from a wireless peripheral. The communication front-end couples with the antenna and is configured to demodulate the received communication signal. The communication front-end also generates a digital data signal that corresponds with the received communication signal. The processor couples with the communication front and is configured to decode the digital data signal. The processor also formats the digital data signal into a USB data format. The formatted data may then be sent to a USB port of a host.

In an alternative embodiment, the wireless peripheral interface couples a plurality of wireless peripherals with a host. The host may be a universal serial bus configured device. At least two wireless peripherals of the plurality of wireless peripherals are playing (e.g., capable of simultaneously communicating). In this embodiment the wireless peripheral interface includes a first and a second antenna, a first and a second communication front-end, and at least one processor.

The first antenna wirelessly couples with a first wireless peripheral to receive a first communication signal. The second antenna wirelessly couples with a second wireless peripheral to receive a second communication signal. The first communication front-end couples with the first antenna and is configured to demodulate the first communication signal. The first communication front-end also generates a first digital data signal. The second communication front-end couples with the second antenna and is configured to demodulate the second communication signal. The second communication front-end also generates a second digital data signal. The processor couples with the first communication front-end and the second communication front-end. The processor is configured to decode the digital data signal and to include information from the digital data signal in a USB build.

One embodiment of a general process for operation of the wireless peripheral interface includes receiving a communication signal from a wireless peripheral. The process then demodulates the received communication signal and generates a digital data signal corresponding with the communication signal. The digital data signal is processed to decode it and determine if it is valid. The process also generates USB information from information in the digital data signal. In one embodiment, the process determines whether the digital data signal is compatible with a current physical USB configuration. If so, the process transmits information from the digital data signal in a structure build with a physical USB configuration. If not, the process generates a build device to enumerate a physical USB configuration based on information in the digital data signal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The above and other more detailed and specific objects and features of the present invention are more fully disclosed in the following detailed description, reference being had to the accompanying drawings, in which.

DETAILED DESCRIPTION OF THE PREFERRED EMBODIMENTS

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) disclosed herein.

Figure 1:
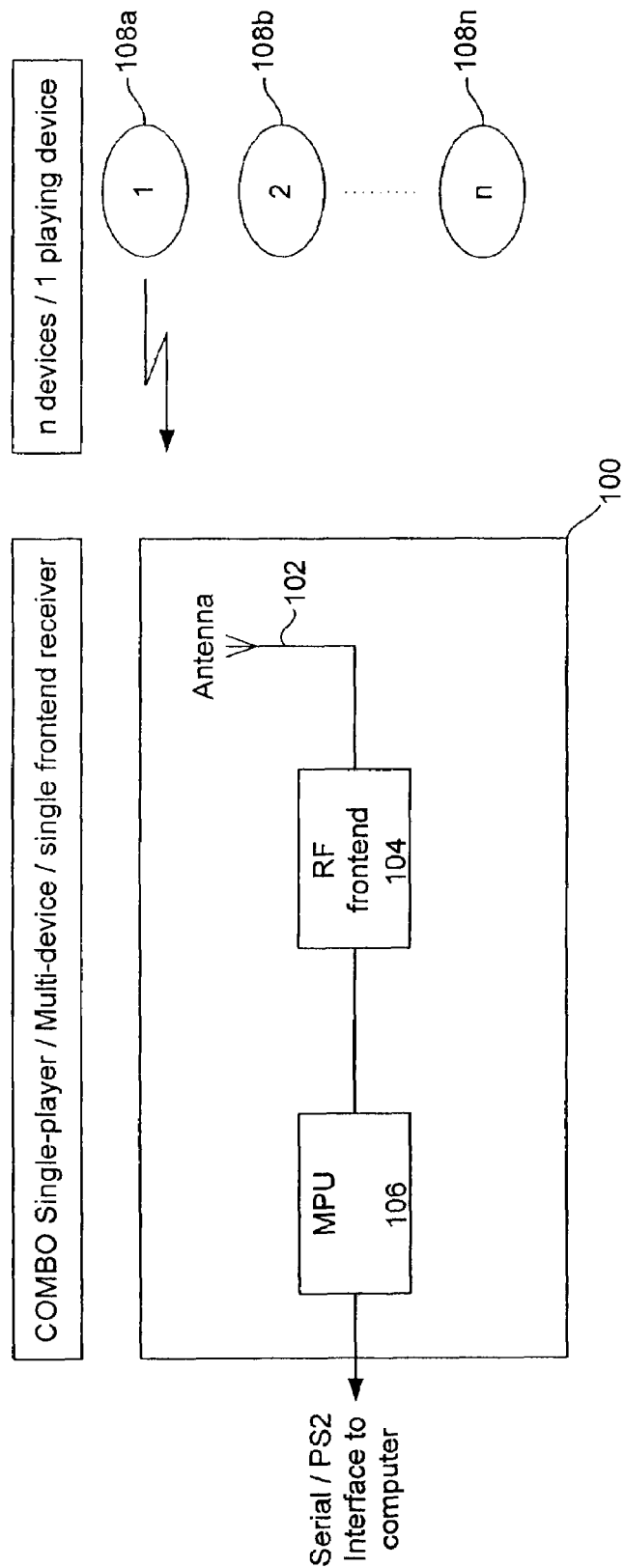
FIG. 1 is a functional block diagram of a single player, multi-device, single RF front-end, wireless peripheral interface having an interface for serial and PS/2 ports in accordance with one embodiment of the present invention.

Referring to FIG. 1, there is shown a general communication system 101 which includes a functional block diagram of a single player, multi-device, single RF front-end, wireless peripheral interface 100 having serial and/or PS/2 ports in accordance with the present invention. The configuration in FIG. 1 is for one wireless peripheral, e.g., 108a, communicating (or playing) with a host. The wireless peripheral interface 100 is an RF hub that includes an antenna 102, an RF front-end 104, and a processor 106.

The processor 106 may be, for example, a central or microprocessor processing unit (MPU) or microcontroller unit (MCU). The wireless peripherals 108a-n (e.g., a wireless keyboard, mouse, trackball, touch pad, joysticks, game controllers, digital camera) transmit RF signals to the RF hub 100. The antenna 102 couple with the RF front-end 104 and receives RF signals form the wireless peripherals 108a-n. The RF signals form a wireless link between the peripherals 108a-n and the hub 100 that couples with a host computer. The wireless link can be either infrared or RF, depending on various implementation criteria, and may be either unidirectional or bi-directional.

Figure 7A:
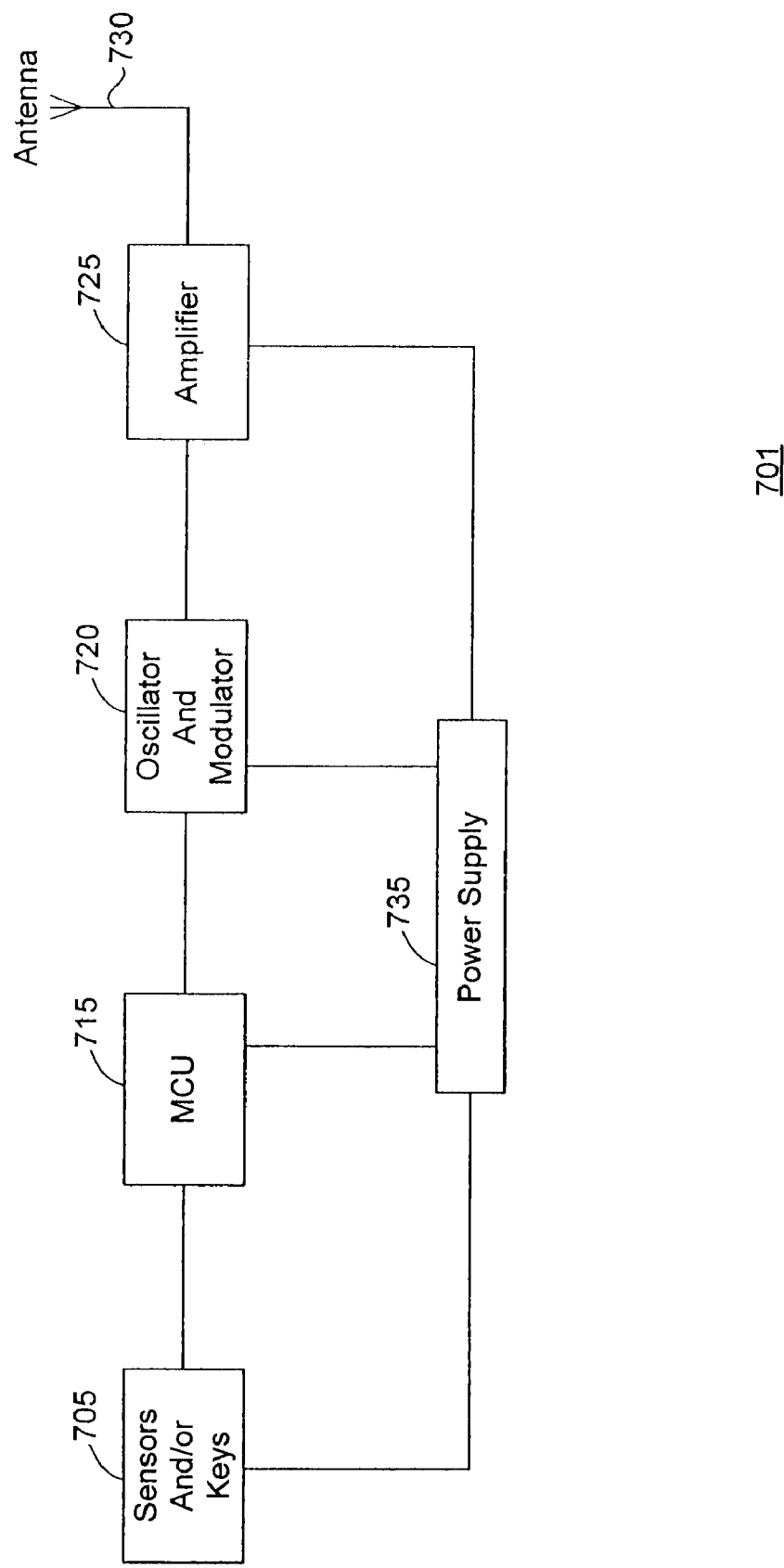
FIG. 7A is a functional block diagram of a first embodiment of a transmitter for a wireless peripheral interface in accordance with the present invention.
Figure 7B:
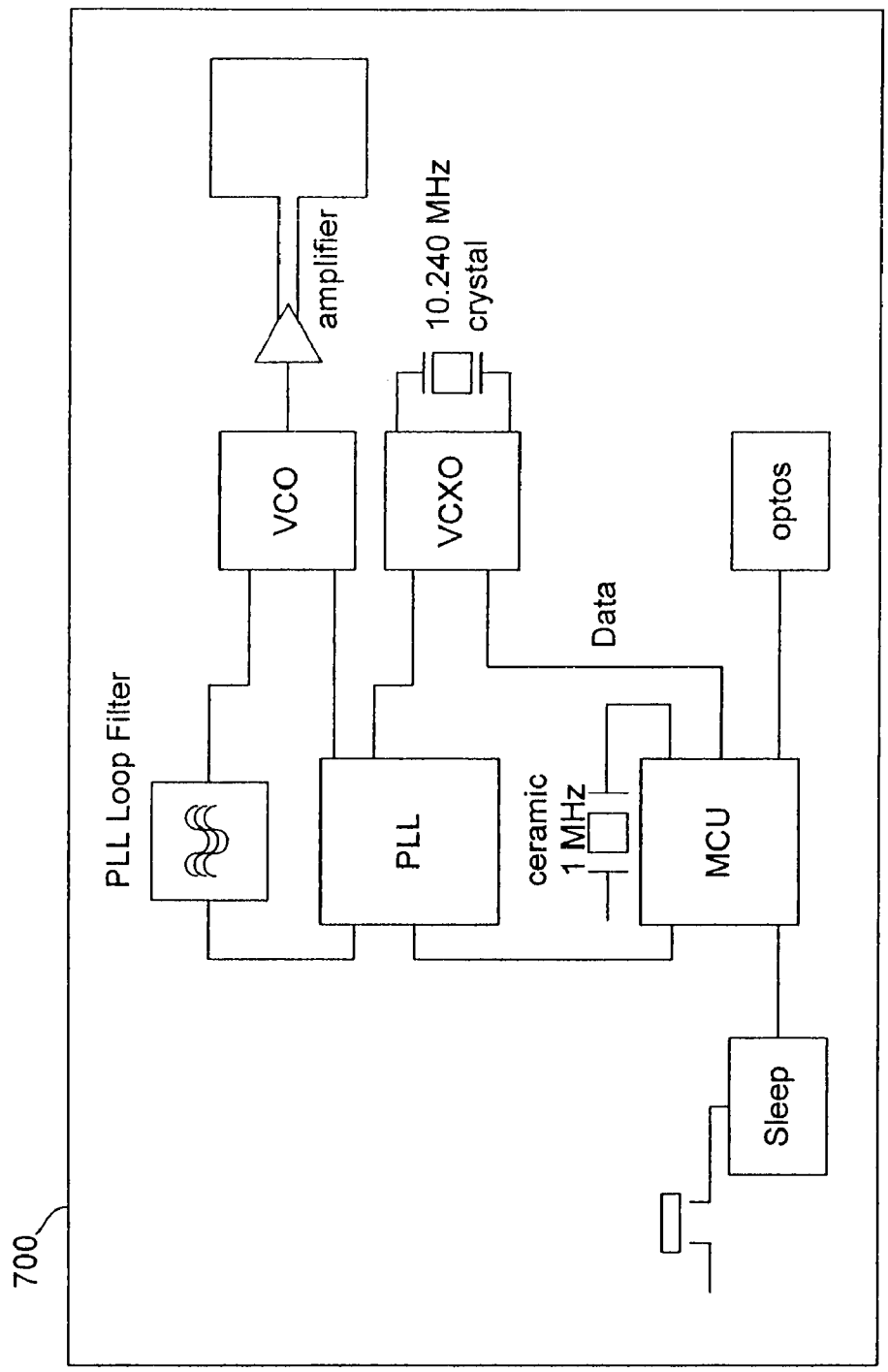
FIG. 7B is a functional block diagram of a second embodiment of a transmitter for a wireless peripheral interface in accordance with the present invention.
Figure 8A:
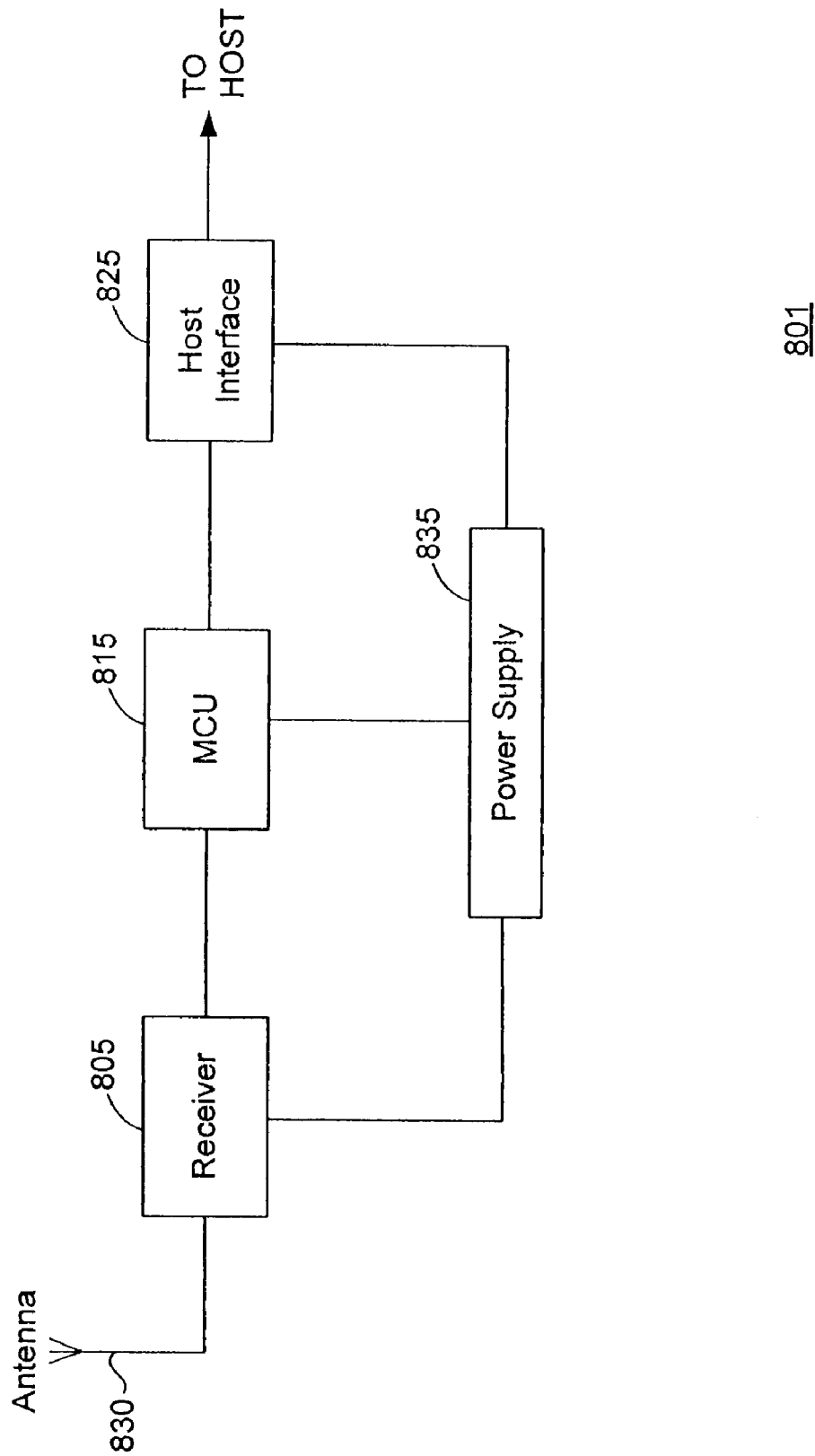
FIG. 8A is a functional block diagram of a first embodiment of a receiver for a wireless peripheral interface in accordance with the present invention.
Figure 8B:
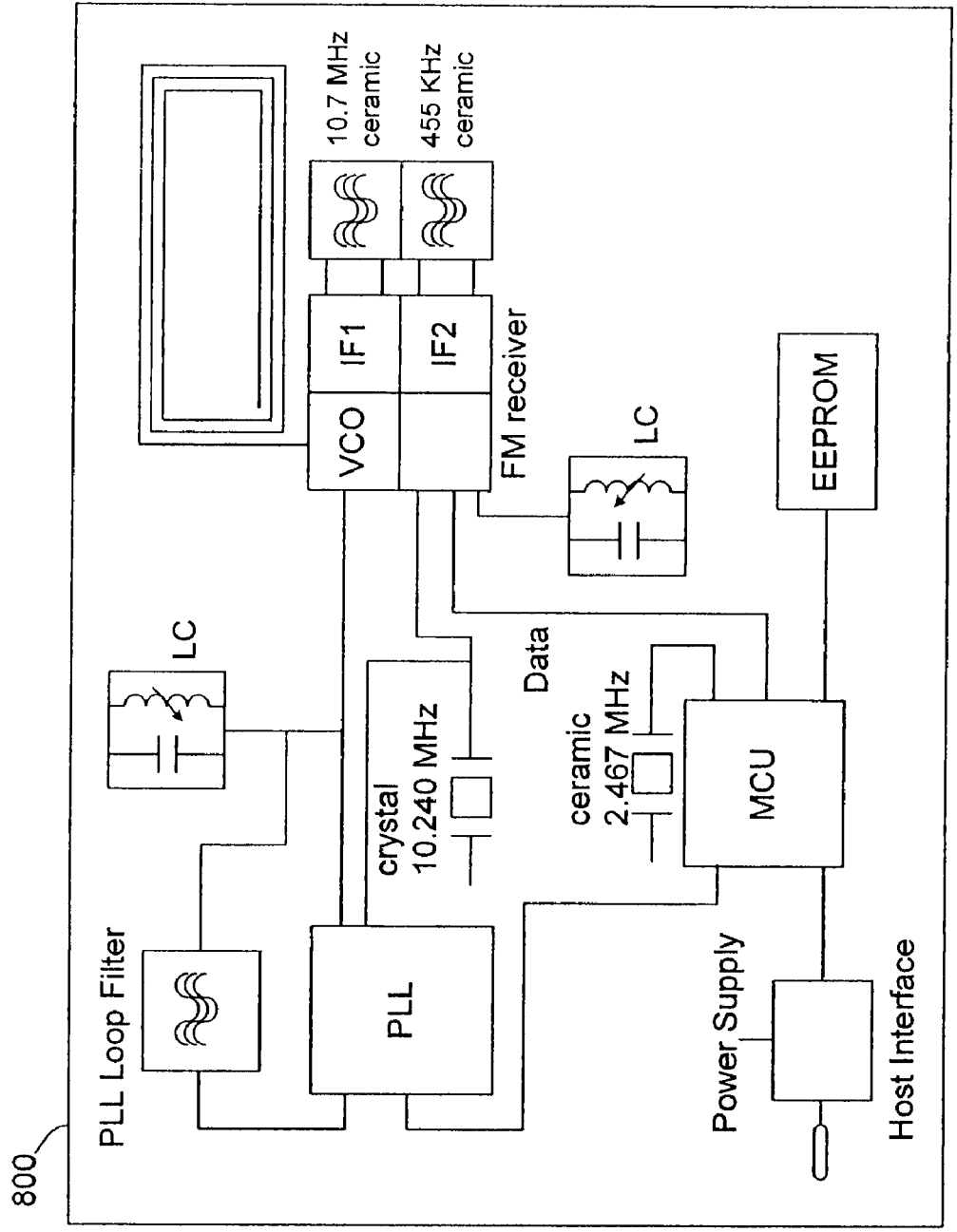
FIG. 8B is a functional block diagram of second embodiment of a receiver for a wireless peripheral interface in accordance with the present invention.

Each of the peripheral devices 108a-n preferably includes a transmitter for transmitting communication signals, e.g., RF signals. Example embodiments of a transmitter are shown in FIGS. 7A and 7B. The RF front-end 104 preferably includes a receiver for receiving communication signals, e.g., RF signals. Example embodiments of a receiver are as shown in FIGS. 8A and 8B.

Embodiments of a transmitter, e.g., transmitter 702, and receiver, e.g., receiver 802, are also described in U.S. Pat. No. 5,854,621, entitled "Wireless Mouse," the relevant portions of which are incorporated by reference. For bi-directional communications, which is also included within the scope of the present invention, each device 108a-n may include both the transmitter and the receiver or, for example, a transceiver. Similarly, the hub 100 would be bidirectional, for example, a transceiver. For ease of discussion only, operation of the present invention(s) may be described with reference to wireless peripherals that transmit communication signals and communication hubs that receive communication signals, although operation in a vice versa direction will be appreciated by those of skill in the art.

The RF front-end 104 receives and demodulates encoded communication signals, e.g., RF signals, from the peripheral devices 108a-n using a communication protocol. A suitable communication protocol is described in U.S. Pat. No. 5,881,366, entitled "Wireless Peripheral Interface," the relevant portions of which are incorporated by reference. Any suitable modulation technique is acceptable, for example, FSK, PSK, Q-PSK or ASK. The carrier may be on the order of 27 MHz, 233 MHz, 433 MHz (e.g., 433.92 MHz) or 900 MHz (e.g., 916.5 MHz) or 2.4 GHz, although any suitable frequency will be acceptable. In addition, while a variety of data encoding algorithms may be used, in one embodiment Miller "Delay Modulation" encoding is used at a rate on the order of, for example, 2.4 kbps (or higher).

The RF front-end 104 is coupled to the processor 106, which processes the demodulated signals received from the RF front-end 104 and sends the data to the appropriate external bus coupled to the host computer (e.g., serial, PS/2). It is noted that the embodiments shown in FIGS. 2-6 below include RF or communication front-ends, which can be implemented as described above with respect to FIG. 1. With regard to the processor 106, it can be an off-the-shelf general-purpose processor or processor-like structure such as a microcontroller. For example, the processor 106 may be a processor or a microcontroller device manufactured by electronic-device manufacturing companies such as Motorola, Intel, Cypruss Semiconductor, or Samsung Electronics.

Figure 2:
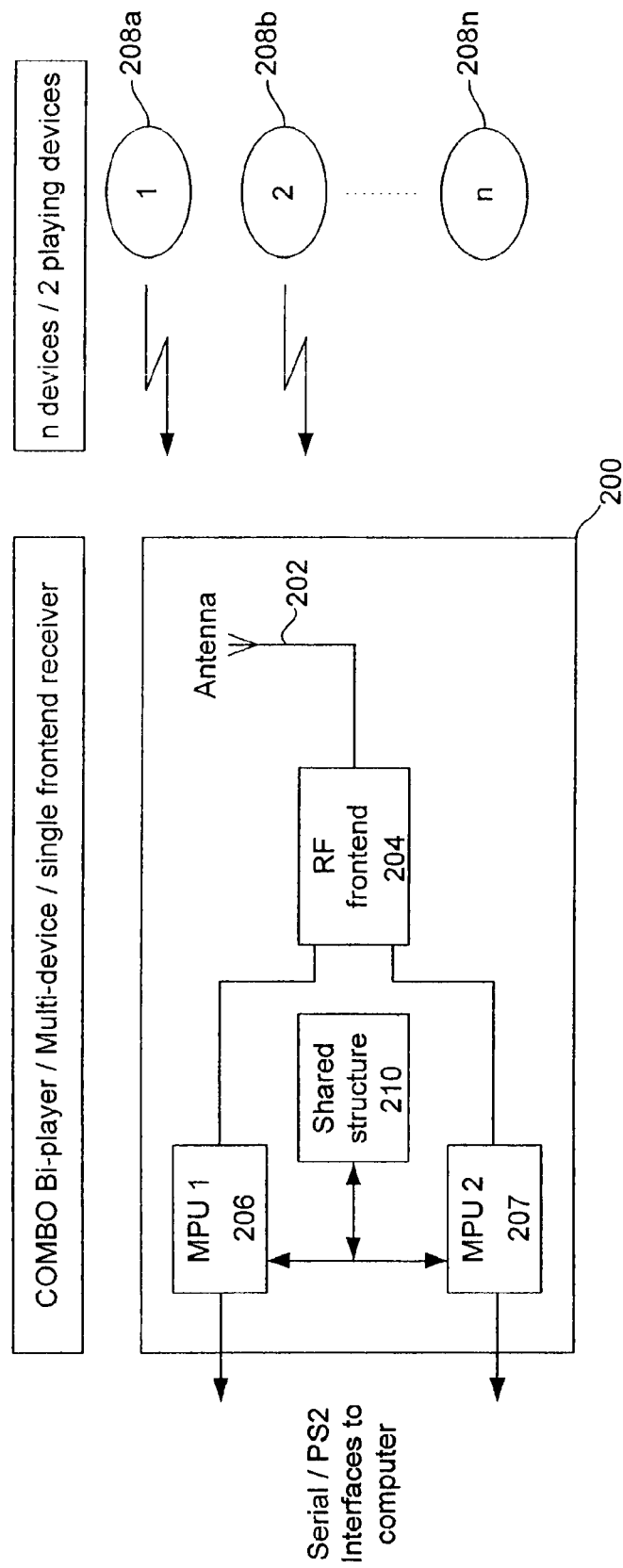
FIG. 2 is a functional block diagram of bi-player, multi-device, single RF front-end, wireless peripheral interface having serial and PS/2 ports in accordance with one embodiment of the present invention.

Referring to FIG. 2, a first embodiment of a communication system 201 is shown with a functional block diagram of a bi-player, multi-device, single RF front-end, RF hub 200 having serial and/or PS/2 ports in accordance with one embodiment of the present invention. The embodiment shown in FIG. 2 is for two players (e.g., bi-player) communicating with a host via one or more peripheral devices 208a-n. The RF hub 200 includes an antenna 202, a RF front-end 204, and processors 206, 207. The RF front-end 204 couples with the processors 206, 207, which may share structures for device setup conditions and power supply management. The shared structure 210 includes, for example, shared memory, shared power supply hardware, shared reset circuitry, and/or shared processing power. Each processor 206, 207, is coupled to the host via an external bus. For example, processor 206 couples with the host via a serial bus port and processor 207 is coupled to the host via a PS/2 port.

Figure 3A:
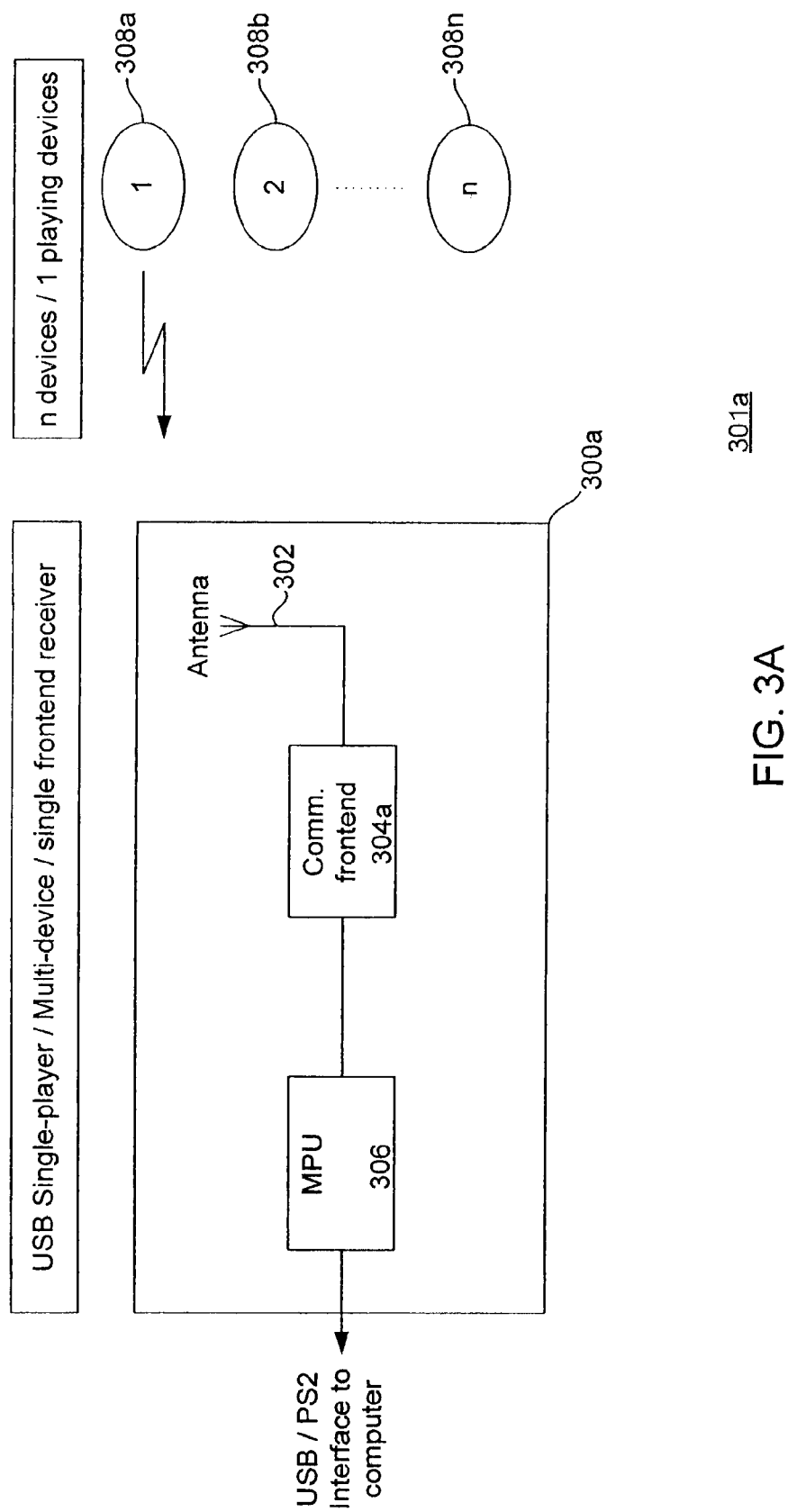
FIG. 3A is a functional block diagram of a Universal Serial Bus (USB) compliant single-player, multi-device wireless peripheral interface having an interface for use with USB and PS/2 ports in accordance with one embodiment of the present invention.

FIG. 3A illustrates a second embodiment of a communication system 301a having a wireless peripheral interface in which a functional block diagram shows a universal serial bus (USB) compliant multi-player, multi-device for use with USB (or USB/PS/2 combination (or combo)) ports in accordance with the present invention. This embodiment of the communication system 301 includes a communication hub 300a, e.g., a wireless peripheral interface including a receiver and/or transmitter, and one or more wireless peripheral devices 308a-n.

The communication hub 300a includes an antenna 302 that is functionally similar to the antenna 102 described above in that it receives communication signals, a communication front-end 304a that is functionally similar to the RF front-end 104 described above in that it processes the received communication signals, and a processor 306 that is functionally similar to the processor 106 described above in that it decodes and appropriately formats the received data. The wireless peripherals 308a-n are functionally similar to the wireless peripherals 108a-n described above.

The communication front-end 304a couples with the antenna 302 and the processor 306. The processor 306 couples with a host computer via a USB port (or connection) or a PS/2 port if the communication hub is a combo. The antenna 302 wirelessly communicates with the one or more peripheral devices 308a-n. The second embodiment of the communication system 301 includes having one or more players communicating with a host via one or more peripheral devices 308a-n.

In this embodiment typically only one wireless peripheral (or device), e.g., 308a, is playing. Playing includes having a communication link established between a communication hub and a wireless peripheral. For example, "connected" wireless peripherals are currently in stand-by mode to transmit information that will be recognized by the communication hub 300a, while "playing" wireless peripherals are currently transmitting information that is recognized by the communication hub 300a. Thus, there may be n devices connected to a communication hub 300a, however, the communication system 301a may only play m devices. Alternatively, there may be n devices connected to a communication hub 300a, but the communication system 301 may be configured to accept m playing devices, where m is less than or equal to n.

In one embodiment, a wireless peripheral, e.g., 308a, may transmit an RF signal from its antenna. The antenna 302 of the communication hub 300a receives this RF signal. The communication front-end 304a demodulates the RF signal and generates a digital data signal. The processor 306 decodes the information in the digital data signal, determines if it is valid data (e.g., no errors) and from within the communication system 301a, and it formats the data. The processor 306 formats the data for either USB or PS/2, depending on the connection port the receiver is coupled with, before sending the data to the host.

Figure 9:
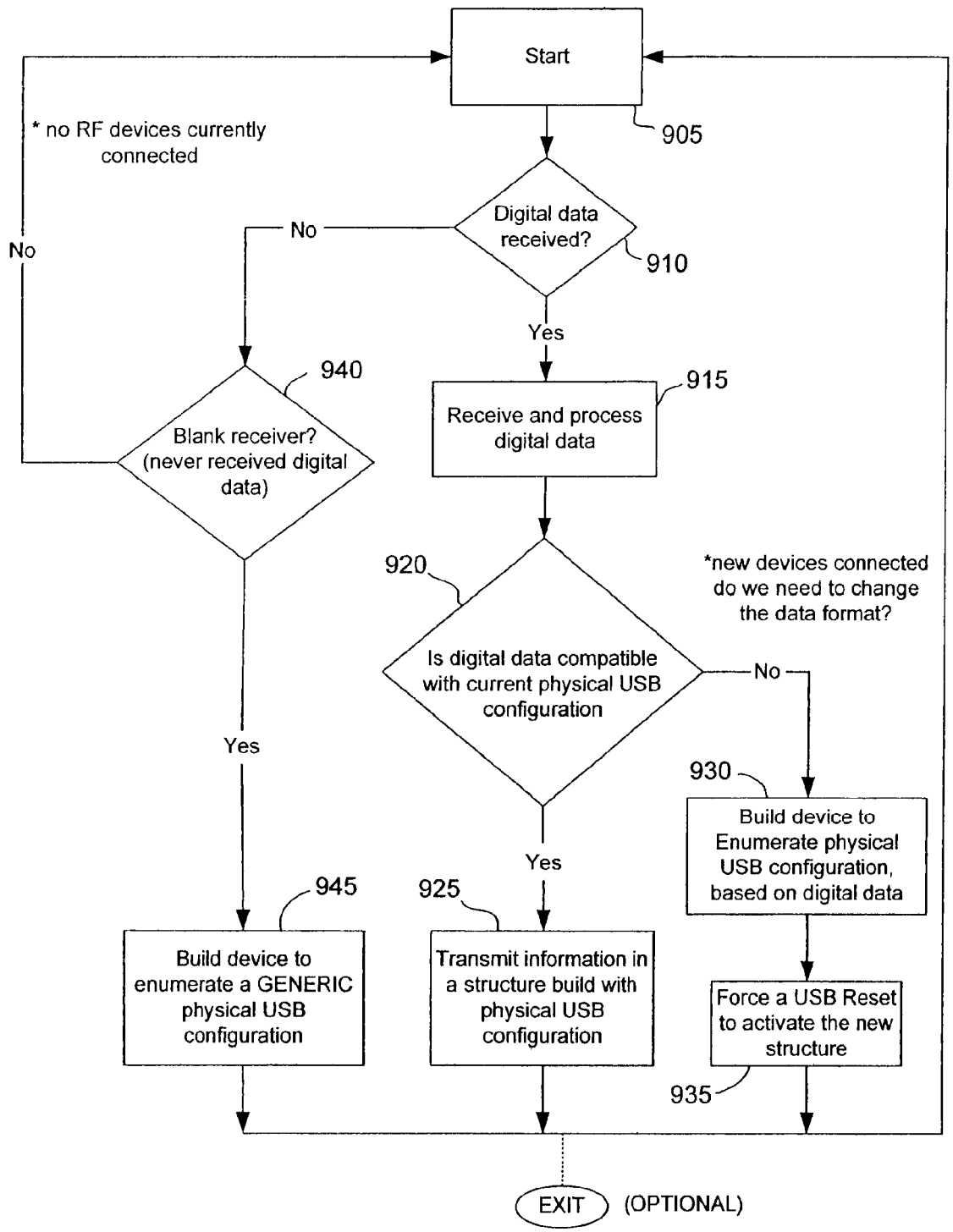
FIG. 9 is a data flow diagram illustrating a method for processing digital data signals to generate USB data signals in accordance with one embodiment of the present invention.

Turning briefly to FIG. 9, there is shown one embodiment for a data flow for processing digital data for a USB format. The process starts 905 with the processor 306 determining 910 whether it has received digital data signal that corresponds to the communication signal transmitted by, for example, the wireless peripheral, e.g., 308a. If a digital data signal is received, the digital data signal is processed to build a device to enumerate a physical configuration for the USB. Building the device may also be referred to as a build of an image.

More particularly, the process continues by determining 920 if the digital data signal is compatible with a current physical USB configuration. If so, the process transmits 925 the digital data signal information in a structure build with the physical USB configuration. The process then goes back to start 905 or exits if the process is stopped. The digital data signal may not be compatible with current the current physical USB configuration if, for example, a new wireless peripheral is connected. In this case, the process builds 930 a device to enumerate the physical USB configuration based on the information in the digital data signal. The process then may force 935 a USB reset to activate the new structure. The process then returns to start or it may exit if, for example, the process is stopped.

If the process determines 910 that it has not received a digital data signal, it may determine 940 if it there is a blank receiver. This may include determining 940 that the process did not receive a digital data signal. If, for example, no wireless devices are currently connected in the communication system 301*a*, the process may return to start to wait for a wireless peripheral to be connected and/or start playing. If, for example, a wireless peripheral is connected to the system, but no digital data signal has been received, the process builds 945 a device to enumerate a generic physical USB configuration. The process then returns to start 905, or alternatively, exits if, for example, the process is stopped.

An advantage of this configuration is its expandability of allowing multiple devices to be able to communicate with a host without adding an additional RF front-end or processor for each device. The USB allows for simplified connectivity to the host by providing a single host communication protocol.

Figure 3B:
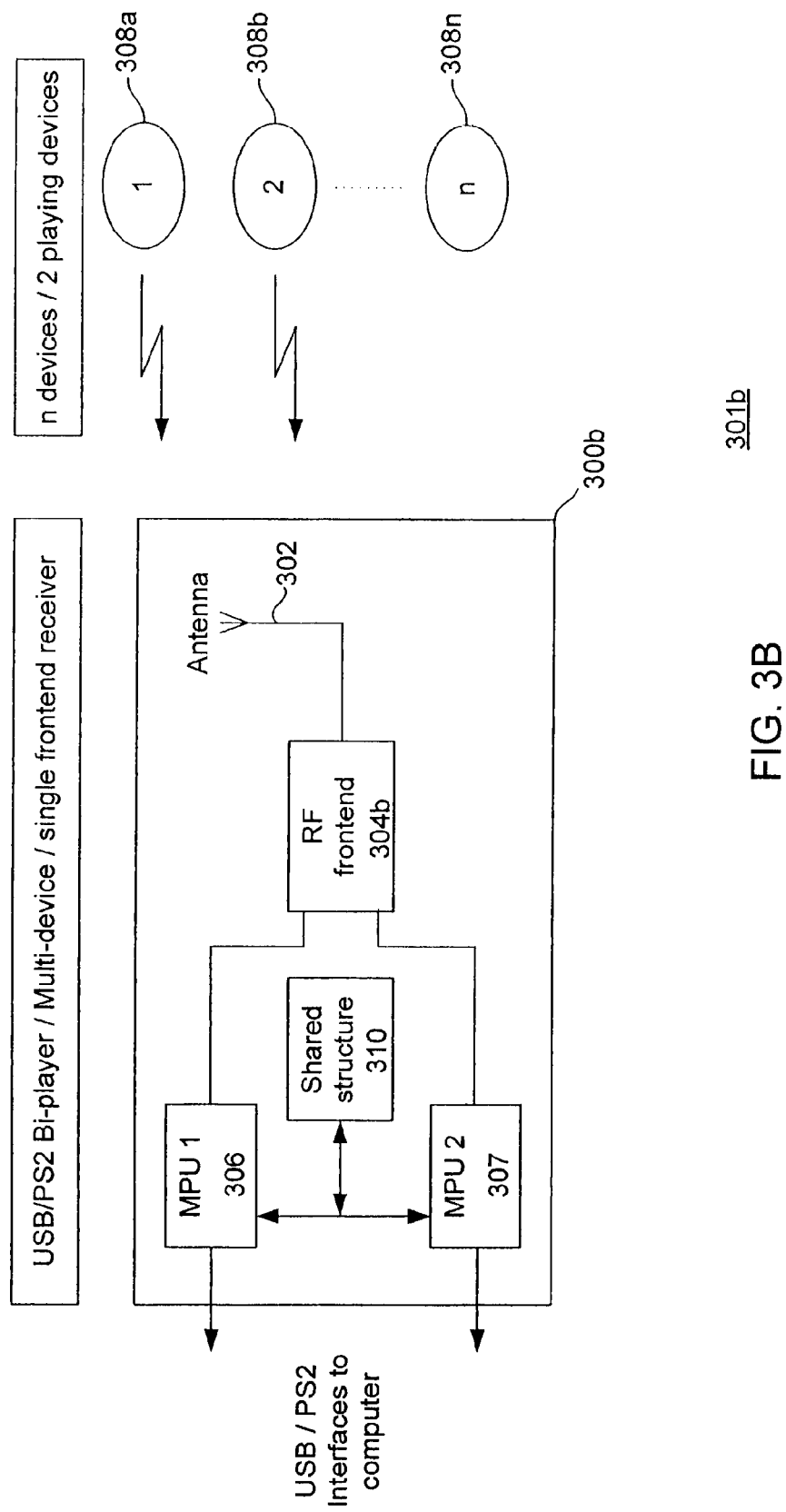
FIG. 3B is a functional block diagram of a bi-player, multi-device, single RF front-end, wireless peripheral interface for use with USB and PS/2 ports in accordance with one embodiment of the present invention.

FIG. 3B illustrates a third embodiment of a communication system 301*b* with a wireless peripheral interface, in which a functional block diagram shows a bi-player, multi-device, single communication (e.g., RF) front-end, for connection with USB (or USB/PS/2 combo) ports in accordance with the present invention. The second embodiment of the communication system 310*b* includes a communication hub 300*b*, e.g., a wireless peripheral interface including a receiver and/or transmitter, and the one or more wireless peripheral devices 300*a*-300*n*. The communication hub 300*b* includes an antenna 302 that is functionally similar to the antenna 102 described above and a shared structure 310 that is functionally similar to the shared structure 210 described above. The communication hub 300*b* also includes a communication front-end 304*b* and a first and a second processor (or MPUs) 306, 307 that are generally functionally similar to the RF front-end 104 and processor 106 described above.

The communication front-end 304*b* couples with the antenna 302 and the first and the second processors 306, 307. The first and the second processors 306, 307 couple with the shared structure 310. The first and the second processors 306, 307 also couple with the host computer through a USB and/or a PS/2 interface. The antenna 302 wirelessly communicates with the one or more peripheral devices 308*a*-*n*.

Operation of the third embodiment of the communication system 301*b* through, for example, the configuration shown in FIG. 3*b*, is for two or more devices playing simultaneously. For example, two wireless peripherals such as a wireless keyboard and a wireless mouse may be operating such that they communicate substantially simultaneously with a host. An antenna in the wireless peripheral device, e.g., 308*a*, 308*b*, transmits a communication signal, e.g., an RF signal, that is received by the antenna 302 of the communication hub 300*b*.

The communication front-end 304*b* receives the communication signal and demodulates that communication signal. The communication front-end 304*b* also separates the communication signal into its appropriate channel based on its frequency. For example, one communication signal may be at a frequency of 27.045 MHz while a second communication signal may be at a frequency of 27.145 MHz. The communication front-end 304*b* also converts the communication signal into a digital data signal.

The first and the second processors 306, 307 are configured to receive the digital data signal of the particular frequency, e.g., the first processor 306 receives a digital data signal associated with the 27.045 MHz data signal and the second processor 307 receives a digital data signal associated 27.145 data signal. The first and the second processor 306, 307 are also configured to decode the digital data corresponding to the received communication signal, determine if that data signal is valid (e.g., no errors), and determine if the data signal is from a device that is within the communication system 301*b* (e.g., configured to communicate with the host). The processors 306, 307 also convert the data signal into a USB (and/or PS/2) format to transmit that data signal to the USB (and/or PS/2) port. An embodiment for the USB conversion is described above and also illustrated in FIG. 9.

The configurations described above advantageously allow for two wireless peripheral devices with asynchronous communication to communicate with a host. Moreover, each device may have its own port, e.g., one USB and one PS/2. Further, the USB wireless peripheral may communicatively couple with a USB port (or connection) of a USB enabled device because the communication data signal may be formatted for that port. It is once again noted that a USB enabled device includes, for example, a host computer system (or host) having a USB connection and an operating system that supports USB specifications.

Figure 4:
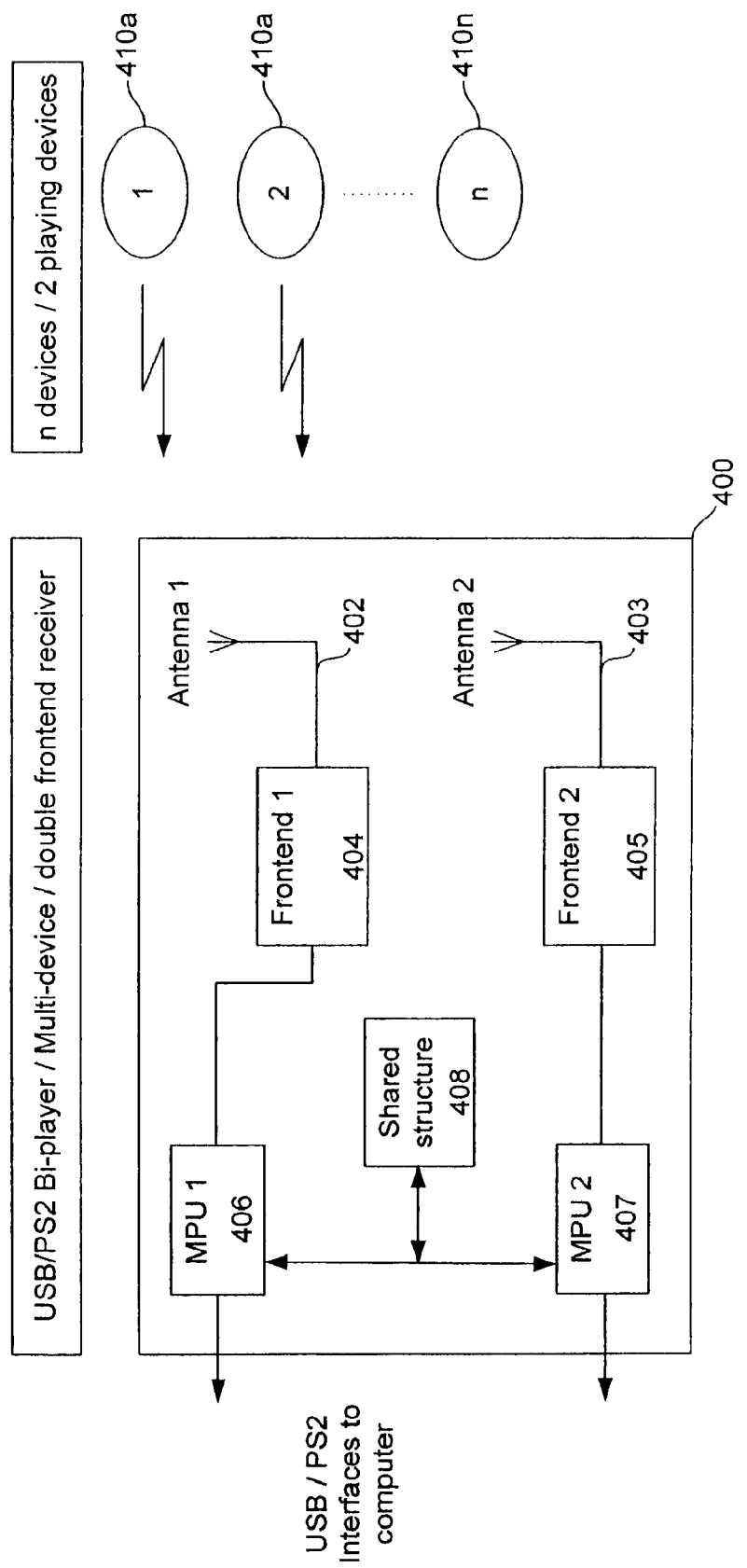
FIG. 4 is a functional block diagram of a bi-player, multi-device, dual RF front-end, wireless peripheral interface having USB and PS/2 ports in accordance with one embodiment of the present invention.

FIG. 4 illustrates a fourth embodiment of a communication system 401 with a wireless peripheral interface, in which a functional block diagram shows a bi-player, multi-device, dual communication front-end, for use with USB (or USB/PS/2 combo) ports in accordance with the present invention. The fourth embodiment of the communication system 401 includes a communication hub 400 and one or more wireless peripheral devices 410*a*-*n*. The communication hub 400 includes a first and a second antenna 402, 403, a first and a second front-end 404, a first and a second processor (MPU) 406, 407, and a shared structure 408. Generally, the antennae 402, 403, communication front-ends 404, 405, processors 406, 407, and shared structures function similar to those described in FIG. 3*b*.

The first communication front-end 404 couples with the first processor 406 and the first antenna 402 to form a first communication hub path. The second communication front-end 405 couples with the second processor 407 and the second antenna 403 to form a second communication hub path. It is noted that the both processors 406, 407 couple with the shared structure 408 and couple with the host computer USB (or PS/2) interface.

In one embodiment, each path includes components (e.g., antenna, communication front-end, and processor) that may be configured to operate by receiving (or transmitting) and processing communication signals from (or to) a wireless peripheral (e.g., any of 410*a*-*n*) operating in particular frequency bandwidths. For example, the first antenna 402 couples with wireless peripherals operating in one frequency bandwidth, e.g., approximately 233 MHz, 433 MHz, 900 MHz, or 2.4 GHz, while the second antenna 403 couples with wireless peripherals operating in another frequency bandwidth, e.g., approximately 27 MHz or 49 MHz.

Each antenna sends the appropriately received communication signal to the communication front-end, e.g., 404 or 405. The communication front-ends 404, 405 demodulate the received communication signal and convert that communication signal into a digital data signal. The appropriate processor, e.g., 406 or 407, receives the digital data signal, decodes it, determines if that data signal is valid (e.g., no errors), and determines if that data is from a device that is configured to communicate with the host (e.g., within the communication system 301*b*). The appropriate processor, e.g., 406 or 407, also converts the data signal into a USB (and/or PS/2) format as described above and in FIG. 9 before it transmits that data signal to the USB (and/or PS/2) port of, for example, a host computer system. It is noted that the dual processor 406, 407 architecture allows for simultaneous and asynchronous communication with a host, for example, a computer system.

The present invention beneficially allows for the use of two independent communication channels (e.g., frequencies or frequency ranges). The present invention also beneficially allows for simultaneous transmission to wireless peripheral devices with full asynchronous communications with a host, for example, a computer system.

Figure 5A:
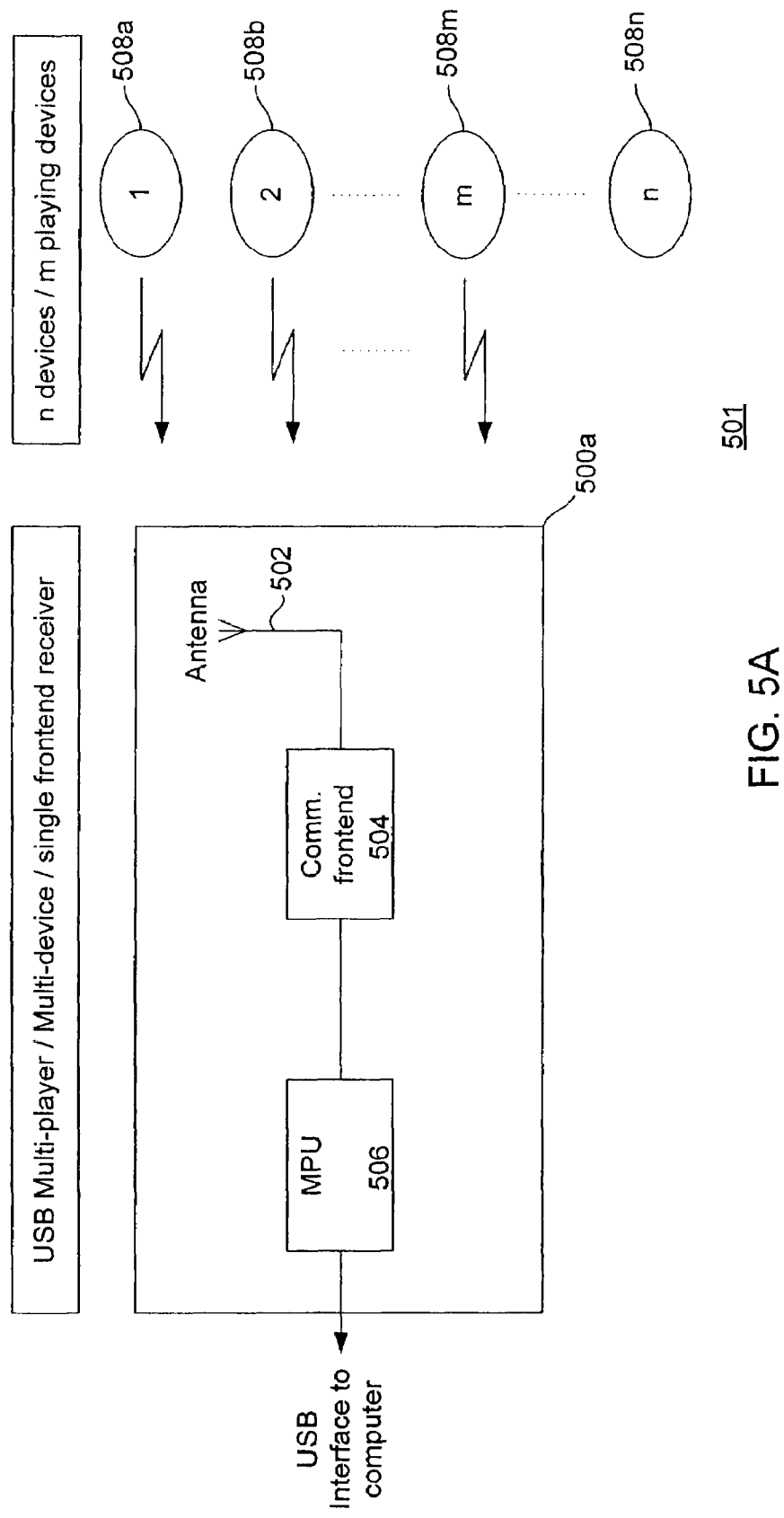
FIG. 5A is a functional block diagram of a multi-player, multi-device, single front-end, wireless peripheral interface for use with USB ports in accordance with one embodiment of the present invention.

FIG. 5A, illustrates a fifth embodiment of a communication system 501 having a wireless peripheral interface, in which a functional block diagram shows a multi-player, multi-device, single communication front-end, for use with USB ports in accordance with the present invention. The communication system 501 includes a communication hub 500*a* and one or more peripheral devices 508*a-n*. The communication hub 500*a* includes an antenna, 502, a communication front-end 504, e.g., an RF front-end, and a processor (or processor-like device or MPU) 506. For the communication hub 500*a*, the communication front-end 504 couples with the antenna 502 and the processor 506. The processor 506 couples with a USB port of a host, e.g., a computer. The antenna wirelessly communicates with the one or more wireless peripherals 508*a-n*.

Generally, the antenna 502 is functionally similar to the antenna, e.g., antenna 302 or 402, described above. The communication front-end 504 generally is functionally similar to the communication front-ends, e.g., communication front-ends 304*b*, 404, or 405, described above. The processor 506 is generally functionally similar to the processors, e.g. processors 306, 307, 406, or 407, described above. The wireless peripherals 508*a-n* are functionally similar to the wireless peripherals, e.g., wireless keyboard, wireless mouse, wireless trackball, wireless joystick, or wireless touch pad, described above.

In this embodiment, one or more wireless peripherals (e.g., 508*a-m*) are capable of simultaneously playing, e.g., communicating with the communication hub 500*a*. The wireless peripherals 508*a-n* may operate within substantially the same frequency range. Each wireless peripheral 508*a-n* includes an antenna that, each of which wirelessly couples the antenna 502 of the communication hub 500*a* through a communication signal when that particular wireless peripheral is playing.

When the communication hub 500*a* is in a receive configuration, the antenna 502 receives one or more communication signals from one or more wireless peripheral, e.g., 508*a-n*. From the antenna 502, the communication signals are received by the communication front-end 504. The communication front-end 504 demodulates and separates the communication signals so that they are associated with the appropriate wireless peripheral. The communication front-end 504 also converts the communication signals into digital data signals. The digital data signals are sent to the processor 506.

The processor 506 processes the digital data signals. More particularly, the processor 506 decodes the digital data signals, determines if those digital data signals are valid (e.g., no errors), and determines is the digital data signals are from a part of the communication system, e.g., 501. The processor 506 also converts the digital data signals into appropriate USB data signal formats as described above and also described in FIG. 9. The processor 506 then transmits those USB-formatted data signals to the USB port for a host computer system to use. In transmit mode, the above path is reversed through the communication hub 500*a*.

An advantage of this configuration is its expandability without adding additional communication front-ends and additional processors for each additional wireless peripheral added to the system. Another advantage of the present invention is that it is scalable so that additional wireless devices may be added to the system without having to re-configure an interface with the host computer system. This substantially reduces the cost of a wireless communication system. The present invention can also allow for multiple wireless peripherals to wirelessly couple with a host. Moreover, the multiple wireless peripherals can simultaneously transmit signals.

Generally, the USB interface may include two or more four-pin USB ports. One USB port may be used for one peripheral, for example, a keyboard and mouse daisy chain, while the other USB may be used to daisy chain other USB devices, for example, a scanner. Thus, the communication hub beneficially includes a USB wireless peripheral interface is particularly well suited for concurrent connection of multiple wireless peripherals with a host.

Figure 5B:
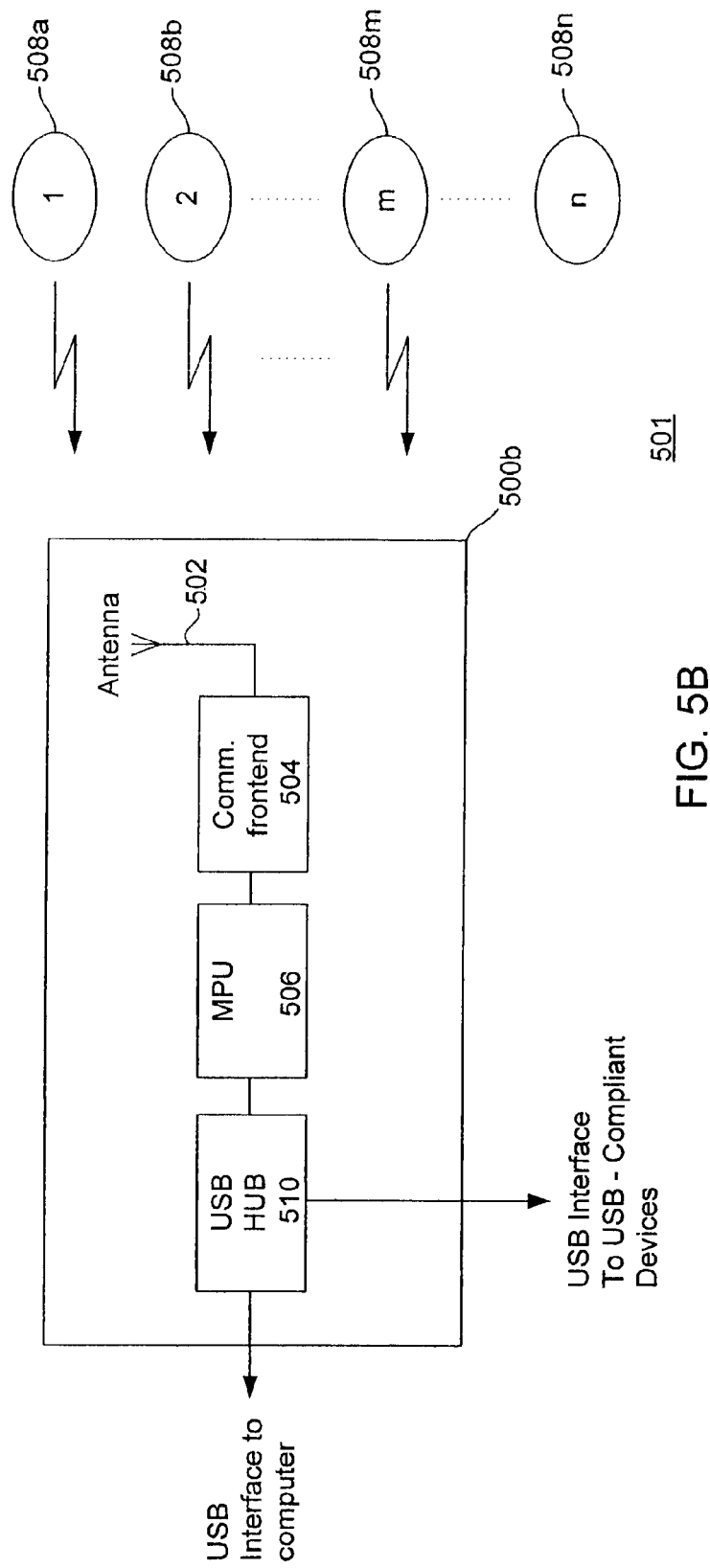
FIG. 5B is a functional block diagram of a multi-player, multi-device, single front-end, wireless peripheral interface including a USB hub in accordance with one embodiment of the present invention.

FIG. 5B is a functional block diagram of a multi-player, multi-device, single front-end, wireless peripheral interface including a USB hub in accordance with one embodiment of the present invention. The communication system 501 includes a communication hub 500*b* and one or more peripheral devices 508*a-n*. The communication hub 500*b* includes the antenna 502, the communication front-end, and the processor 506 as described above. The communication hub 500*b* also includes a USB hub 510. The USB hub 510 couples with the USB port or connection of, for example, the host computer system. The USB hub 510 includes one or more USB ports or connections having the physical and firmware characteristics for connecting one or more USB-compliant devices, for example, a digital camera or a scanner.

Figure 6A:
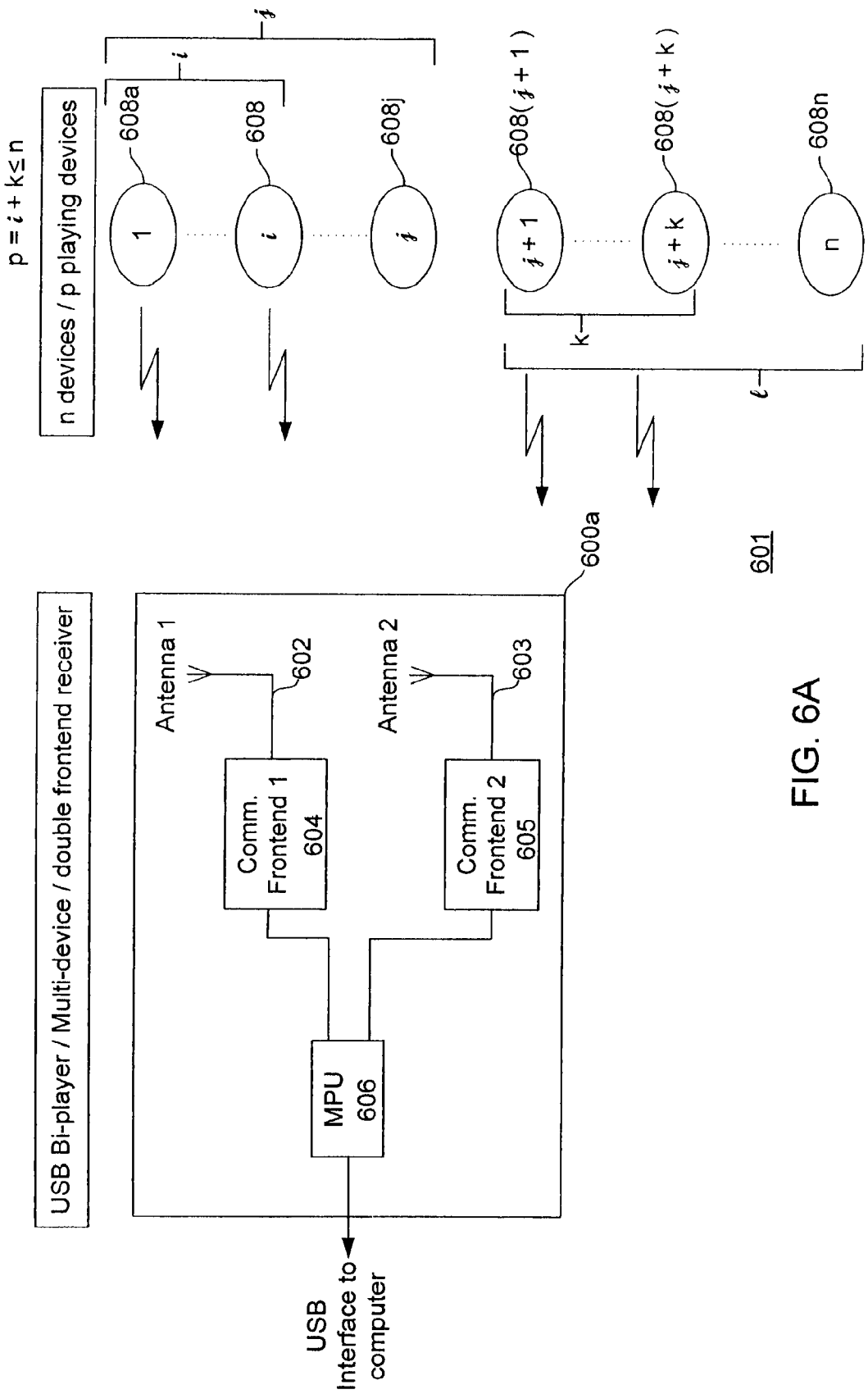
FIG. 6A is a functional block diagram of a multi-player, multi-device, dual communication front-end, wireless peripheral interface for use with USB ports in accordance with one embodiment of the present invention.

FIG. 6A illustrates a sixth embodiment of a communication system 601 having a wireless peripheral interface, in which a functional block diagram shows a multi-player, multi-device, dual communication front-end, for use with USB ports in accordance with the present invention. The communication system 601 includes a communication hub 600*a* that communicates with a host computer system via a USB port and with one or more wireless peripheral devices 608*a-n* via wireless communication signals. In one embodiment j wireless peripherals may be able to communicatively couple with the first communication front-end 604 and l wireless peripherals may be able to communicatively couple with the second communication front-end 605.

The communication hub 600 includes a first and a second antenna 602, 603, a first and a second communication front-end 604, 605, and a processor (or processor-like device or MPU) 606. Generally, the first and the second antennae 602, 603 are functionally similar to, for example, the antennae 402, 403, 502 described above. The first and the second communication front-ends 604, 605 are functionally similar to, for example, the communication front-ends 404, 405, 504 described above. The processor 606 is functionally similar to, for example, the processors 406, 407, 506 described above.

The first communication front-end 604 couples with the first antenna 602 and the processor 606 to form a first communication hub path. The second communication front-end 605 couples with the second antenna 603 and the processor 606 to form a second communication hub path. It is noted that portions of a shared structure may also couple appropriate structures in the communication hub 600a. The processor 606 couples a USB port of a USB enabled device, for example, a host computer system.

In one embodiment, each path includes components (e.g., antenna, communication front-end, and processor) that are configured to operate by receiving (or transmitting) and processing communication signals from (or to) a wireless peripheral (e.g., any of 608a-n) operating in particular frequency bandwidths. For example, the first antenna 602 couples with wireless peripherals operating in one frequency bandwidth, e.g., approximately 233 MHz, 433 MHz, 900 MHz, or 2.4 GHz, while the second antenna 603 couples with wireless peripherals operating in another frequency bandwidth, e.g., approximately 27 MHz or 49 MHz. Alternatively for example, j wireless peripherals are connected to the first communication front-end 604, while i wireless peripherals may be playing (e.g., communicating at the same time), such that i is less than or equal to j. In addition, l wireless peripherals are connected to the second communication front-end 605, while k devices may be playing, such that k is less than or equal to l.

Each antenna sends the appropriately received communication signal to the communication front-end, e.g., 604 or 605. The communication front-ends 604, 605 demodulate the received communication signals and convert them into appropriate digital data signals. The processor 606 receives the digital data signal and decodes it. The processor 606 then determines if that data signal is valid (e.g., no errors) and from a wireless peripheral in the communication system 601. The processor 606 also converts the data signal into a USB format as described above and also in FIG. 9. The processor 606 then transmits that data signal to the USB port of the USB enabled device, for example, a host computer.

One benefit of the multi-player, multi-device configuration is that multiple wireless peripheral devices, e.g., 608a-n, can communicate with the communication hub 600a, which is capable of decoding multiple wireless signal streams. Hence, two or more wireless peripherals can beneficially be playing simultaneously and the communication hub 600a can independently recognize each. Further, the present invention allows for two or more wireless peripherals each operating at a different frequency range to communicate with a host using the same communication hub 600a. The communication hub 600a beneficially provides a uniform interface to a USB interface, e.g., for a host computer, for each of the wireless peripherals. Using the same communication hub 600a eliminates the additional space and additional costs associated with requiring separate hubs for each wireless peripheral.

Figure 6B:
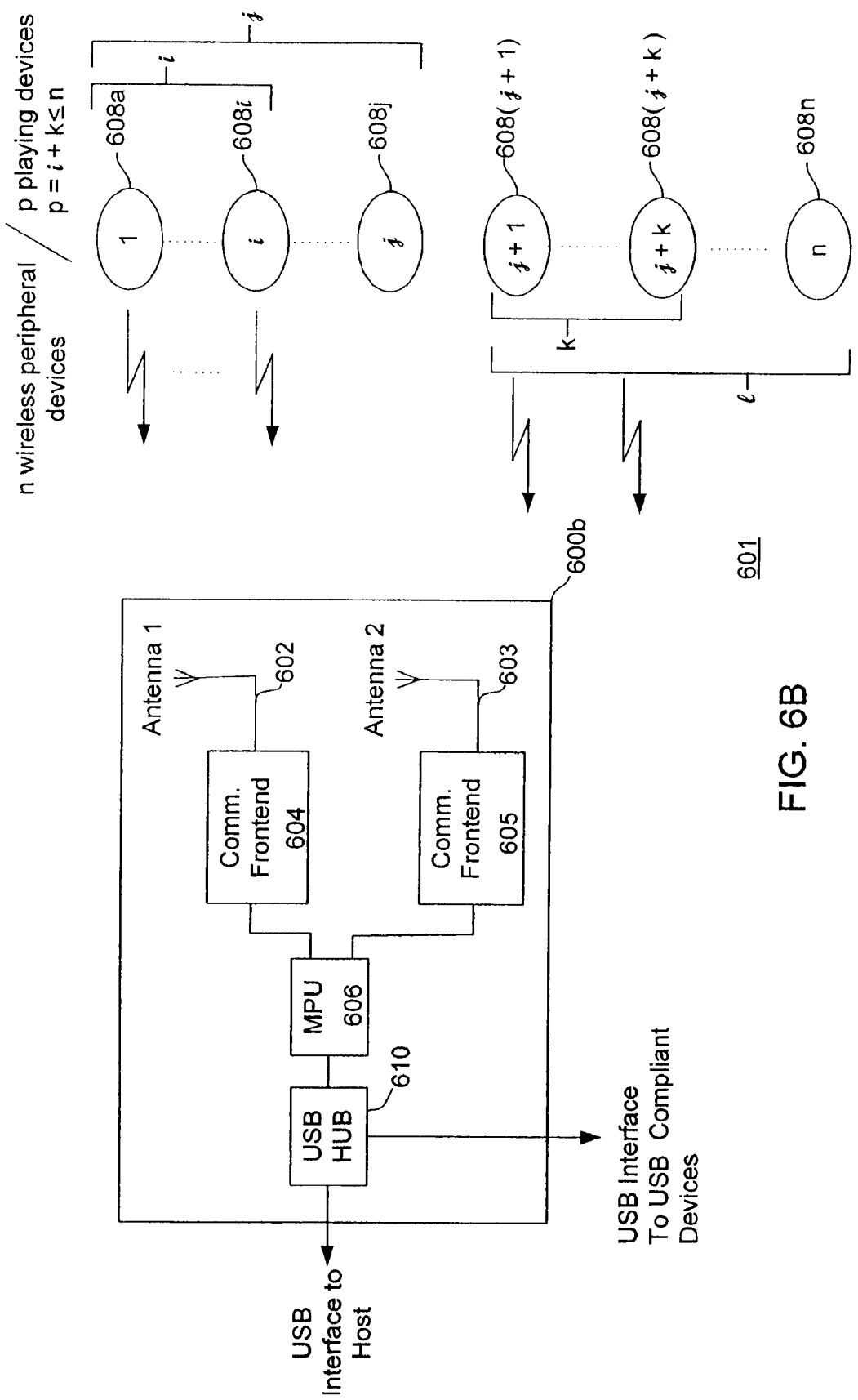
FIG. 6B is a functional block diagram of a multi-player, multi-device, dual communication front-end, wireless peripheral interface USB hub in accordance with one embodiment of the present invention.

FIG. 6B is a functional block diagram of a multi-player, multi-device, dual communication front-end, wireless peripheral interface USB connect in accordance with one embodiment of the present invention. The communication system 601 includes a communication hub 600b and one or more peripheral devices 608a-n as described above. The communication hub 600b includes the antennae 602, 603, the communication front-ends 604, 605, and the processor 606 described above. In addition, the communication hub 600b also includes a USB hub 610. The USB hub 610 may couple with the USB port or connection of, for example, the host computer system. The USB connect 510 may also include one or more USB ports or connections having the physical and firmware characteristics for connecting one or more USB-compliant devices, for example, a digital camera or a scanner.

FIGS. 7A and 7B are functional block diagrams of embodiments of a communication transmitter for a wireless peripheral interface in accordance with the present invention. The communication transmitter may be used in either or both a communication hub and a wireless peripheral device. The communication transmitter may any communication transmitter, for example, an RF-technology transmitter, a Bluetooth-technology transmitter, or a HomeRF-technology transmitter. Generally, the communication transmitter will be described through the communication transmitter 701 shown in FIG. 7A. Those of skill in the art will recognize that the principles discussed with FIG. 7A may be applied to the communication transmitter shown in FIG. 7B.

The communication transmitter 701 includes sensors and/or keys 705, a microcontroller unit (MCU) 715, an oscillator and modulator 720, an amplifier 725, an antenna 730, and a power supply 735. These components may be functionally similar to some of the components described above, for example, the antennae 604, 605, the communication front-ends 604, 605, the processors 606, and the shared structures. In addition, it is noted that these components may be conventional components. For example, the MCU 715 may be a microcontroller circuit from companies such as Motorola, Intel, Cypruss Semiconductor, or Samsung Electronics. The sensor and/or keys 705 couples with the MCU 715. The MCU 715 couples with the oscillator and modulator 720. The oscillator and modulator 720 couples with the amplifier 725. The amplifier 725 couples with the antenna 730. The power supply 735 couples the sensors and/or keys 705, the MCU 715, the oscillator and modulator 720, and the amplifier 725.

Generally, the keys and/or sensors 705 couple with user interface mechanisms, for example, keys on a keyboard or keypad, buttons on a mouse, trackball, or joystick, a rollers on a mouse or trackball, a touch sensor on a touch pad, or a photosensor on an optical device. The keys and/or sensors 705 detect an action by user. From this detection, the MCU 715 generates a data signal. The oscillator and modulator 720 generate a communication signal, e.g., an RF signal, from this data signal. The amplifier 725 and transmitted via the antenna 730 amplifies the communication signal.

FIGS. 8A and 8B are functional block diagrams of embodiments of a communication receiver for a wireless peripheral interface in accordance with the present invention. The communication receiver may be used in either or both a communication hub and a wireless peripheral device. The communication receiver may any communication receiver, for example, an RF-technology receiver, a Bluetooth-technology receiver, or a HomeRF-technology receiver. Generally, the communication receiver will be described through the communication receiver 801 shown in FIG. 8A. Those of skill in the art will recognize that the principles discussed with FIG. 8A may be applied to the communication receiver shown in FIG. 8B.

The transmitter 801 includes an antenna 830, a receiver 805, a microcontroller unit (MCU) 815, a host interface 825, and a power supply 835. These components may be functionally similar to some of the components described above. Further, in devices having both transmit and receive capability, the antenna 830 may be the same as the antenna 730 described above, the MCU 815 may be the same as the MCU 715 described above, and the power supply 835 may be the same as the power supply 835 described above. It is noted that these components may be conventional components. The antenna 830 couples with the receiver 805. The receiver 805 couples with the MCU 815. The MCU 815 couples with the host interface 825. The power supply 835 couples with the antenna 830, the receiver 805, the MCU 815, and the host interface 825.

Generally, the antenna 830 receives one or more communication signals transmitted from the antenna of a transmitter. The receiver 805 is included in a communication front-end to separate the one or more communication signals based on frequency of that signal so that it can be associated with a particular device. Further, the receiver 805 converts the communication signal into a digital data signal. The MCU 815 receives the digital data signal and processes it. More particularly, the MCU 815 decodes the digital data signal, determines if that data signal is valid (e.g., no errors) and from a wireless peripheral within its communication system, converts the data signal into a USB format, and transmits that data signal for the USB port of a host. The host may be any USB enable device. The host interface 825 includes the appropriate connections for coupling with the host.

The disclosure provides a few embodiments for creating, designing, and manufacturing a communication hub including a USB wireless peripheral interface (e.g., 300a, 300b, 400, 500a, 500b, 600a, 600b) in accordance with the present invention. The functionality disclosed may be incorporated into a communication hub of varying form factors. For example, in one embodiment the communication hub may have a form factor of defined by a standards organization such as the Personal Computer Memory Card International Association (PCMCIA) specification or Compact Flash (CF)™ Association specification. In another embodiment, the communication hub may have a custom form factor of, for example, approximately 10 centimeters by 6 centimeters by 2 centimeters.

Upon reading this disclosure, those of skill in the art will appreciate still additional alternative methods and designs for an antenna system in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An interface for coupling a plurality of cordless peripheral devices, each communicating on a different frequency within a frequency band, with a universal serial bus configured device, the interface comprising:
   an antenna wirelessly coupled to concurrently receive a plurality of communication signals, each communication signal having a different frequency within a frequency band and corresponding to a different cordless peripheral;
   a communication front-end coupled to the antenna and configured to demodulate each of the plurality of communication signals,
      process, in parallel, each of the plurality of communication signals based on its frequency, and
      generate, for each of the plurality of communication signals, a digital data signal; and
   a processor coupled to the communication front-end for decoding the plurality of digital data signals, wherein the processor is configured to format each digital data signal into a universal serial bus data format to establish universal serial bus communication with the universal serial bus configured device.

2. The interface of claim 1, wherein the universal serial bus configured device comprises a computer system.

3. The interface of claim 1, wherein the first cordless device comprises a computer mouse and a second cordless device comprises a keyboard.

4. The interface of claim 1, wherein the frequency band comprises a range of 27 MHz to 50 MHz.

5. A method for wirelessly coupling a plurality of peripheral devices, each communicating on a different frequency within a frequency band, with a host system having a universal serial bus input/output interface, the method comprising:
   concurrently receiving a first communication signal at a first frequency from a first peripheral device and a second communication signal at a second frequency from a second peripheral device;
   demodulating each of the first and second communication signals and processing each based on its frequency;
   generating a digital data signal for each demodulated processed communication signal;
   decoding each digital data signal; and
   formatting each digital data signal into a universal serial bus data format to establish universal serial bus communication with the first and second peripheral devices.

6. The method of claim 5, wherein formatting further comprises generating a build image, the build image corresponding to a protocol configuration of the universal serial bus input/output interface.

7. The method of claim 5, wherein the first peripheral device comprises a computer mouse and the second peripheral device comprises a keyboard.

8. The method of claim 5, wherein the frequency band comprises a range of 27 MHz to 50 MHz.

9. A computer readable medium configured to store instructions executable by a processor to wirelessly couple a plurality of peripheral devices, each device communicating at frequency within a frequency band, with a host system having a universal serial bus input/output interface, the instructions when executed by the processor causing the processor to:
   receive a plurality of communication signals from the plurality of peripheral devices, at least two communication signals having a different frequency;
   demodulate each communication signal; and
   process each communication signal based on its frequency to:
      generate a digital data signal for the communication signal;
      decode the digital data signal; and
      format the digital data signal into a universal serial bus data format to establish universal serial bus communication with the peripheral device.

10. The computer readable medium of claim 9, wherein the instruction that causes the processor to format further comprises an instruction to cause the processor to generate a build image, the build image corresponding to a protocol configuration of the universal serial bus input/output interface.

11. The computer readable medium of claim 9, wherein a first peripheral device of the plurality of peripheral devices comprises a cordless mouse communicating at a first frequency and a second peripheral device of the plurality of peripheral devices comprises a cordless keyboard communicating at a second frequency.

12. The computer readable medium of claim 9, wherein the frequency band comprises a range of 27 MHz to 50 MHz.

13. An interface for coupling a plurality of peripheral devices, the devices communicating within a frequency band, with a universal serial bus, the interface comprising:
- a means for receiving a plurality of communication signals within a frequency band, each communication signal corresponding to a peripheral device of the plurality of peripheral devices;
- a means for demodulating each communication signal;
- a means for processing, in parallel, the plurality of communication signals, each based on its frequency band, and for each communication signal from a peripheral device, for;
  - generating a digital data signal for each demodulated communication signal;
  - decoding each digital data signal; and
  - formatting each digital data signal into a universal serial bus data format to establish communication between the universal serial bus and the peripheral device.

14. The interface of claim 13, wherein the means for formatting further comprises a means for generating a build image, the build image corresponding to a protocol configuration of the universal serial bus.

15. The interface of claim 13, wherein each of the plurality of peripheral devices is one from a group consisting of a mouse, a trackball, a remote controller, a video camera, a game device, and a joystick.

16. The interface of claim 13, wherein the frequency band comprises a range of 27 MHz to 50 MHz.

17. The interface of claim 13, wherein a first peripheral device of the plurality of peripheral devices comprises a cordless mouse and a second peripheral device of the plurality of peripheral devices comprises a cordless keyboard.

* * * * *